(No Model.)
F. WINTER.
RENDERING.
No. 399,810. Patented Mar. 19, 1889.
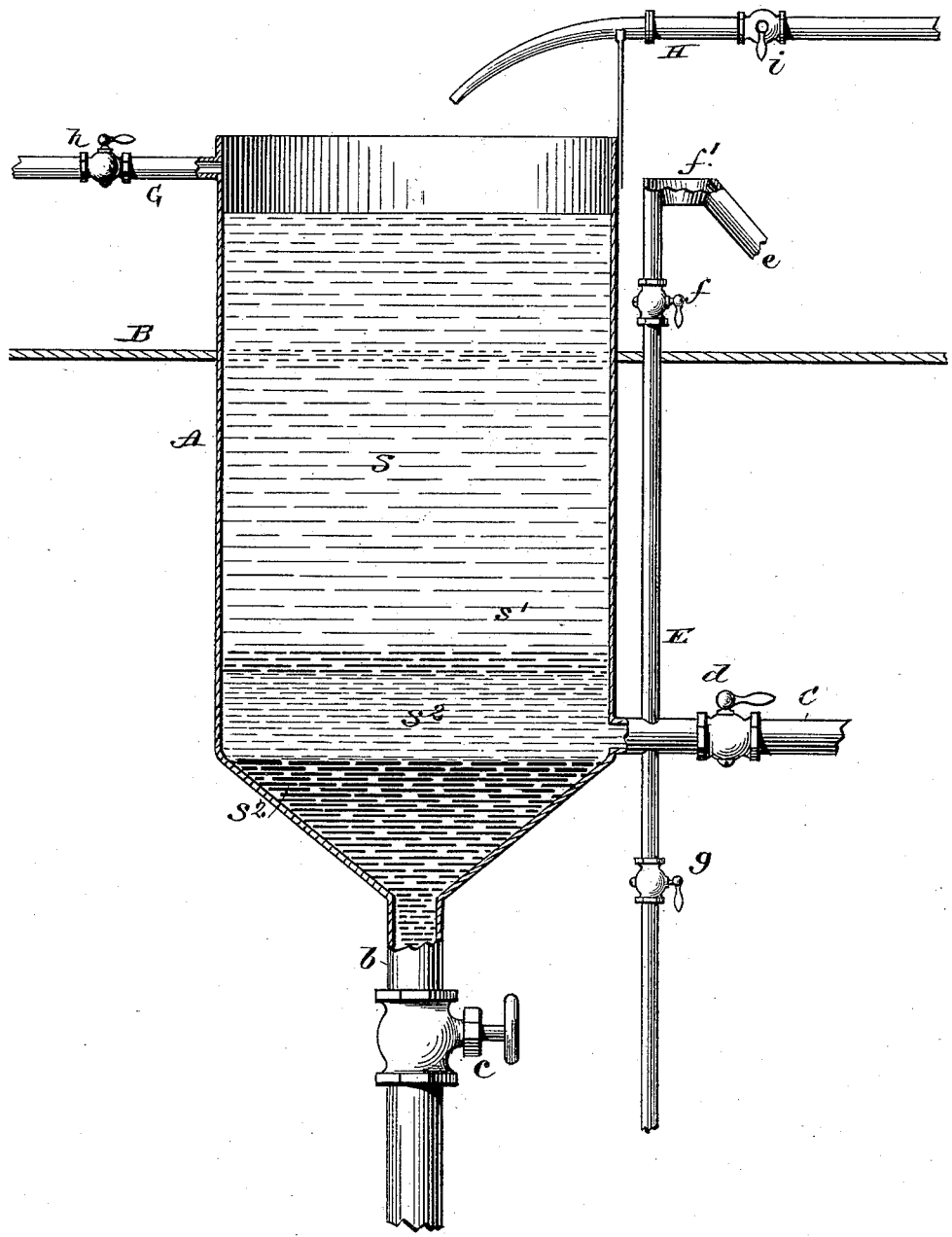
WITNESSES:
INVENTOR:
ATTORNEYS.

UNITED STATES PATENT OFFICE.

FREDERICK WINTER, OF ALLEGHENY, PENNSYLVANIA.

RENDERING.

SPECIFICATION forming part of Letters Patent No. 399,810, dated March 19, 1889.

Application filed March 10, 1888. Serial No. 266,833. (No specimens.)

*To all whom it may concern:*

Be it known that I, FREDERICK WINTER, of the city and county of Allegheny, and State of Pennsylvania, have invented a new and useful Improvement in the Manufacture of Neutral Stock from Crude Animal Fat, of which the following is a full, clear, and exact description.

This invention consists in a novel process for the manufacture of neutral stock from crude animal fats. The same includes a new method of handling the crude fat and applying the heat for melting it, the washing and purification and melting all being accomplished in one process and at the same time, and all foreign and extraneous matter being carried away from the body of the fat by a continuous stream of water of a suitable temperature to accomplish the desired result most economically, substantially as hereinafter described, and pointed out in the claim.

Reference is to be had to the accompanying drawing, forming a part of this specification, in which the drawing represents a mainly sectional elevation of a simple construction of a kettle and its attachments used in carrying out the invention, but which may be varied to suit different localities.

A is the body of a kettle in which the fats are treated, and which may be of tapering form below, terminating in a pipe, $b$, controlled by a valve, $c$, for emptying the kettle of residue.

B indicates the floor-line of the kettle.

C is a pipe controlled by a valve, $d$, for introducing water into the kettle near its base. This pipe is intersected by an upright pipe, E, terminating above in an overflow spout or outlet, $e$, and having a sight-opening, $f'$, above for observing the overflow. The overflow-outlet $e$ and lower end of the pipe E are supposed to connect with or empty into the sewer, and said pipe is provided above with a valve, $f$, for stopping the overflow when required, and with another valve, $g$, below the pipe C for drawing off surplus water from the kettle.

G is a pipe connected with the kettle above or near its top and controlled by a valve, $h$, for drawing off clear fat from the kettle, and H is a pipe or hose controlled by a valve, $i$, for introducing water into the crude fat pulp.

The operation is as follows: The valves $i$, $g$, $c$, and $h$ are closed and the valves $f$ and $d$ opened, and heated water at a temperature at which the melting is to take place allowed to flow into the kettle by the pipe C until it begins to overflow from the pipe E by the outlet $e$. The valve $d$ is then closed. This fills the kettle with heated water up to the overflow-line and makes it ready to receive the fat. The animal fat is then taken in the condition it is received from the abattoir or butcher, with the animal heat out of it, and without any preliminary washing, trimming, freezing, or any "handling" whatever, and is reduced to a pulp by any of the machines now in use for such purpose, or by any other suitable machine, care, however, being taken to use a machine that does away with stringiness in the pulp. Such crude fat pulp is now dropped directly from the machine onto the surface of the water in the kettle A. Simultaneously with this or when beginning to introduce the fat, the valve $i$ in the hose or pipe H is opened, so as to admit a steady stream of heated water at the required temperature to melt the fat onto the latter in the kettle, when surplus water will begin to overflow by the pipe E at the outlet $e$. The heated water entering the kettle by the hose or pipe H must be of the same temperature as that at which the melting is to take place, and by reason of its greater specific gravity than that of the fat it will sink to near the bottom of the kettle, from whence it will be carried out by the overflow-pipe E, and will pass out along with it all soluble and such foreign matter as blood, dirt, glutinous matter, free soluble fatty acids, and other soluble odorously offensive matter, leaving the fat in the kettle clear, fresh, and neutral.

The greater part of the exhausted tissue or "slush" will be found at the bottom of the kettle, and a small part of the slush carrying all the chondrin with it will be found floating on the water below the fat. The operation is thus far completed when the fat is all melted and clear and the water at the overflow is clear. The condition being as just stated, the further ingress of heated water by the pipe H is shut off by closing the valve $i$, and the valve $f$ in the overflow-pipe is also closed, and the contents of the kettle allowed to stand for some time to settle. These contents are shown in the drawing as follows: $s$ indicates the clear fat; $s'$, the slush and chondrin floating on the water; $s^2$ and $s^3$, the slush at the bottom of the kettle.

To draw off the fat, the valve $f$ in the overflow-pipe being closed, the valve $h$ in the draw-off pipe G is now opened and the valve $d$, controlling the heated water-supply pipe C, also opened, but gradually or slowly only. This will cause water to flow into the kettle from below and the clear fat to flow out by the pipe G. The valve $d$ is allowed to remain open until all the fat is run out by the pipe G, after which the valve $d$ is closed and the valve $g$ opened. This allows all surplus water to run off. When, however, the top body of slush appears to be passing through the valve $g$, then said valve is closed and the valve $c$ in the bottom outlet, $b$, from the kettle is opened, which will allow all the remaining contents of the kettle to run off. This completes the whole operation.

In the operation as described it will be observed that the fat pulp falling onto the heated water previously introduced into the kettle immediately begins to melt and float upon said water, thereby avoiding what is known as a "solid kettle" of fat and all necessity of breaking up the same, and dispensing with stirring or agitating devices for the purpose. After this the complete melting of the fat or fat pulp is effected by the introduction of hot water from above. It will also be seen that the crude fat without any previous handling or treatment is melted direct, the washing, purification, and melting all being done by the same process, or at the same time, and that all foreign and extraneous matter is carried away from the fat by a continuous stream of heated water in a downward direction, and kept from mixing with the fatty contents of the kettle, and ultimately and separately discharged from the latter. It will be seen, too, that in the treatment of the fat as described no chemicals are necessary to be used.

The temperature of the heated water introduced beneath and onto the crude fat to effect the melting and treatment of the same, as described, may be regulated by the valves which control the introduction of the water, or otherwise.

Having thus described my invention, what I claim as new, and desire to secure by Letters Patent, is—

In the process herein described of manufacturing neutral stock from crude animal fat, first reducing the fat to a pulp, then passing the same onto a body of heated water, next subjecting the fat to a stream of heated water from above, whereby the melting of the fat is completed, and slush, tissue, and foreign matters soluble in water are washed out of and removed from the fat, and subsequently, and after settling, drawing off the clear fat, essentially as set forth.

FRED. WINTER.

Witnesses:
PHILIP SCHULZ,
J. B. NOBBS.